Aug. 18, 1970 R. R. RITTER 3,524,994

SIGNAL RECOVERING APPARATUS

Filed Aug. 21, 1967 3 Sheets-Sheet 1

INVENTOR.
ROLLAND R. RITTER
BY Bruce A. Nemer
AGENT

SIGNAL RECOVERING APPARATUS

INVENTOR.
ROLLAND R. RITTER
BY Bruce A Nemer
AGENT

SIGNAL RECOVERING APPARATUS

Filed Aug. 21, 1967 3 Sheets-Sheet 3

INVENTOR.
ROLLAND R. RITTER
BY Bruce A. Nemer
AGENT

United States Patent Office 3,524,994
Patented Aug. 18, 1970

3,524,994
SIGNAL RECOVERING APPARATUS
Rolland R. Ritter, St. Paul, Minn., assignor to Control Data Corporation, Minneapolis, Minn., a corporation of Minnesota
Filed Aug. 21, 1967, Ser. No. 661,878
Int. Cl. H03k *5/00*
U.S. Cl. 307—235 10 Claims

ABSTRACT OF THE DISCLOSURE

An electronic circuit is disclosed which is adapted for recovering the time information in degraded noise modulated logic type signals from magnetic tape by providing a logic type output whenever a signal peak occurs after the instantaneous peak to peak amplitude of an input signal exceeds a given threshold level. The circuit includes a logic circuit which accepts the signal output from a peak to peak amplitude detecting circuit and a peak detecting circuit and provides the recovered logic type signal when the presence of the outputs from each circuit indicates that the input signal has exceeded the peak to peak difference desired and an input signal peak has occurred.

An electronic circuit for performing the peak to peak amplitude detection is also disclosed.

BACKGROUND

Magnetic tape is used as a means for storing logic type signals in many computer applications because it is a relatively inexpensive and convenient means for storing vast quantities of information. There are problems, however, in storing signals on magnetic tape; logic type signals degrade to appear more like analog signals, and noise masks the signal. That is, the rise time and fall times of logic type signals are increased obscuring the time information in a signal, and the base line may be modulated by noise. The signal issuing from the tape is then unfit for use in a computer and must be recovered before it can be applied to normal computing channels.

DESCRIPTION

The present invention is an electronic circuit accepting an analog type signal which represents a degraded logic type signal where the information is contained at the time the logic type signal changes states, for recovering the time information in the analog signal while rejecting signals of a low level, presumably noise.

Further objects and advantages may be ascertained from an understanding of the description of the illustrative embodiment of the invention and from the appended claims.

The illustrative embodiment may best be described by reference to the accompanying drawings where:

Figure 1:
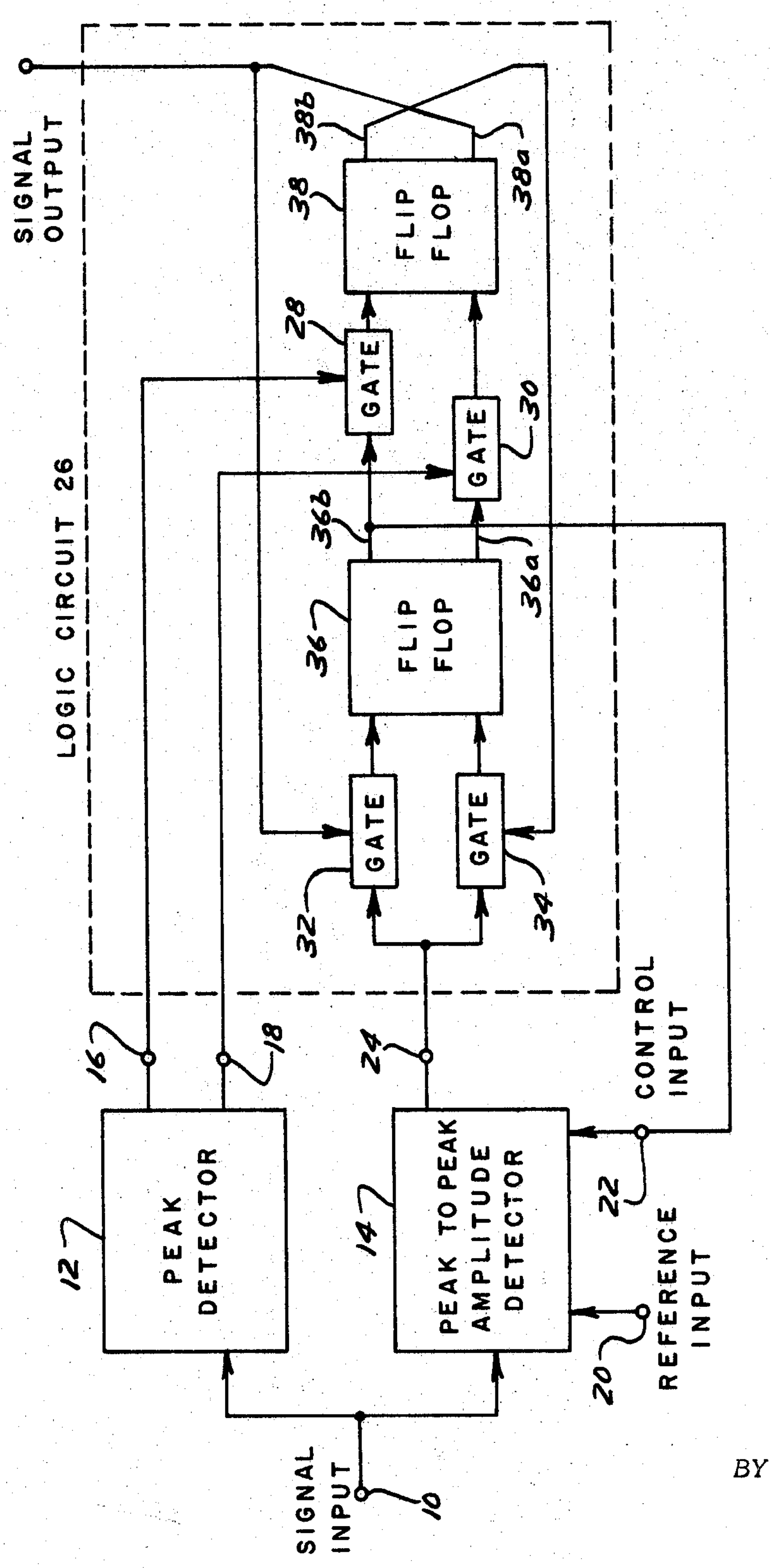
FIG. 1 shows a block diagram of an electronic circuit using the teachings of the present invention.

In FIG. 1 a signal input, from magnetic tape for example, is applied to an input means 10 and then to both a peak detector 12 and a peak to peak amplitude detector 14. Peak detector 12 has complementary outputs 16 and 18. Amplitude detector 14 has a reference input 20 which is adapted to receive a reference signal, a control input 22, and an output 24. Signals from outputs 16, 18, and 24 are applied to a logic circuit 26 including gates 28, 30, 32 and 34 and flip flops 36 and 38. Flip flops 36 and 38 have outputs 36*a*, 36*b*, 38*a*, and 38*b*. The recovered signal output is taken from output 38*b*, and the signal to control input 22 is taken from output 36*b*. Gates 28, 30, 32 and 34 are connected to flip flops 36 and 38 to form a simple four phase clock or counter where inputs from amplitude detector 14 and peak detector 12 control the progression of the counter. Outputs from both peak detector 12 and amplitude detector 14 must occur for the counter to advance one complete cycle or four phase times.

Flip flops 36 and 38 are of a common type where a "1" input from gate 32 causes a "1" at output 36*b* which remains after the "1" input from gate 32 is removed, and a "1" input from gate 34 causes a "1" at output 36*a* which remains after the "1" input from gate 32 is removed. Flip flop 38 reacts similarly. A "1" input from gate 28 causes a "1" at output 38*b*, and a "1" input from gate 30 causes a "1" at output 38*a*.

Gates 28, 30, 32, and 34 are also of a common type which require "1" signals at all inputs before a "1" output is provided.

Peak detector 12 is a signal differentiating circuit followed by an amplifier and logic circuitry. The differentiating circuit provides a signal approximating the differential or slope of the input signal to a logic circuit which then switches at the zero crossover points. Thus, 16 and 18 are complementary logic outputs, one of which always is a "1" and which change logic states after a signal peak occurs.

Figure 2:
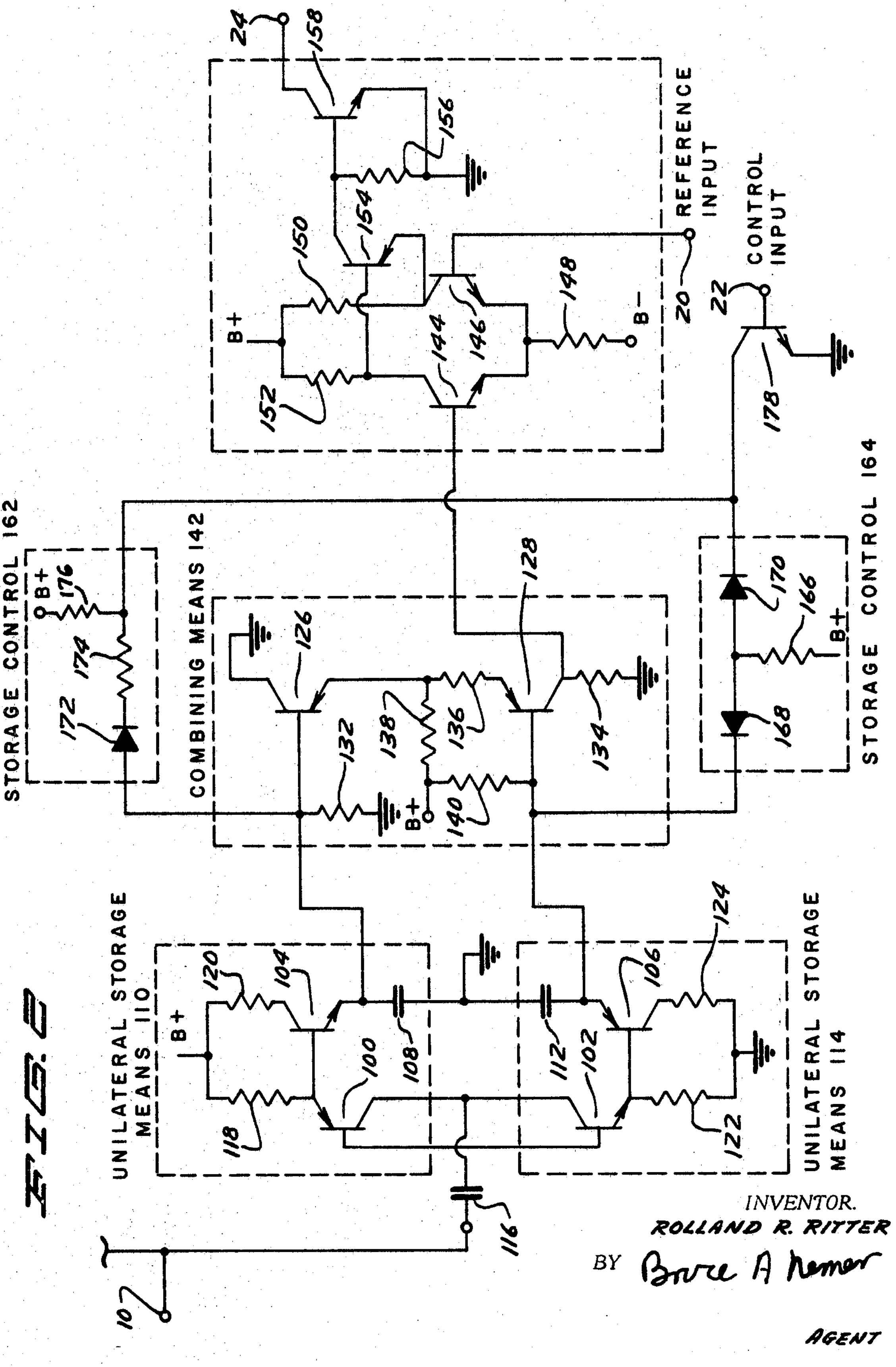
FIG. 2 shows a preferred schematic diagram of a block labeled "peak to peak amplitude detector" within FIG. 1.

One embodiment of amplitude detector 14 is shown in FIG. 2. In FIG. 2, transistors 100, 102, 104, and 106 form two sets of complementary, temperature and bias compensated transistor pairs. Transistors 100, 104 and their biasing networks along with a capacitor or storage means 108 form a unilateral storage means 110. Similarly, transistors 102, 106, and their biasing networks along with a capacitor or storage means 112 form a second unilateral storage means 114. The signals from both unilateral storage means are provided to a pair of temperature and bias compensated transistors 126 and 128 in emitter follower configuration. These transistors, along with a biasing network, form a combining means 130. Combining means 130 accepts the double ended signal from the storage means and provides a single ended signal to a comparing means 142. Two storage control means 162 and 164 are individually connected, one to each storage means, for controlling the length of time each storage means will store a signal. Both storage control means are in turn controlled by a transistor 178. The base of transistor 178 forms control input 22 of FIG. 1. The base of a transistor 146, part of a differential comparator within comparing means 142, forms reference input 20 of FIG. 1.

Figure 3:
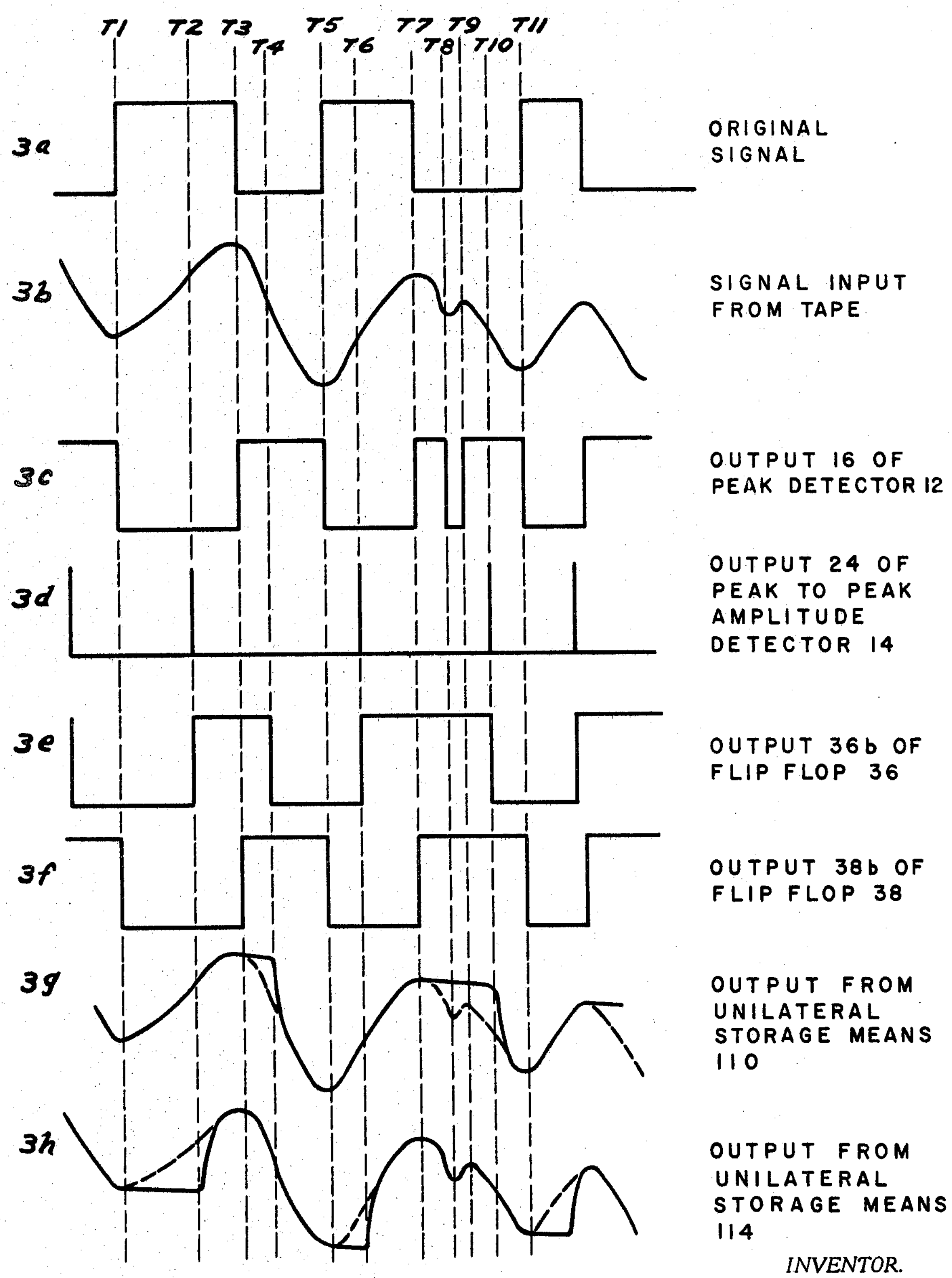
FIG. 3 shows signals at various points within FIGS. 1 and 2.

In FIG. 3 the original data signal, before it is stored on tape, is shown in FIG. 3*a*. The times this signal changes logical states represents the information. FIG. 3*b* shows the signal shown in 3*a* after it has been stored on and extracted from magnetic tape. The signal in FIG. 3*b* forms the analog type signal input applied to input means 10 of FIG. 1. The remainder of the signals shown in FIG. 3 are representative of typical signals at various points within FIGS. 1 and 2. The "0" state is shown along the base line, and the "1" state is shown in an upward direction.

OPERATION

Turning now to the operation of a preferred embodiment of the invention, generally the circuit of FIG. 1 operates by providing an output signal when an input signal peak occurs after the input signal exceeds a given threshold. Amplitude detector 14 provides an output when the input signal exceeds the value of a reference signal provided to reference input 20; outputs 16 and 18 of peak detector 12 change logic states when a signal peak occurs; and logic circuit 26 provides an output when there is a correct sequence of output signals from peak detector 12 and amplitude detector 14.

As explained, peak detector 12 has complementary logic outputs 16 and 18. That is, whichever logic state—"0" or "1"—exists at one output, the other output will provide the opposite logic state.

A preferred embodiment of peak to peak amplitude detector 14 will be explained with reference to FIG. 2. Generally, amplitude detector 14 provides a logic "1" output whenever the input signal at signal input 10 exceeds the reference signal provided to reference input 20. The function of control input 22 will be explained with reference to FIG. 2.

Having explained the general operation of FIG. 1 and its basic components, a more specific explanation will now be made with reference to FIG. 3. For the purposes of explanation, assume a time immediately after T1. FIG. 3*f* shows output 38*b* of flip flop 38 is in a "0" state. Therefore, output 38*a* of flip flop 38 is in a "1" state. Also, FIG. 3*e* shows output 36*b* of flip flop 36 in a "0" state. Since output 38*a* one input to gate 32, is in a "1" state, gate 32 needs a "1" output from amplitude detector 14 to change the state of output 36*b* from a "0" to a "1". This output is provided at T2 when the peak to peak value of the input signal exceeds a value proportional to the reference signal supplied to reference input 20. At T2, both inputs to gate 32 are "1" and gate 32 provides a "1" output which changes output 36*b* of flip flop 36 from a "0" to a "1"; this is shown in FIG. 3*e*. The "1" from output 36*b* is provided to gate 28. The other input to gate 28 is derived from output 16 of peak detector 12 which is in the "0" state at time T2; so, output 38*b* of flip flop 38 does not change states at time T2. At T3, a signal peak is reached and output 16 of peak detector 12 changes to a "1," as is shown in FIG. 3*c*. The "1" from output 16 provides the second "1" to gate 28 which in turn now can provide a "1" to flip flop 38 to cause output 38*b* to change to a "1." The output signal is taken from output 38*b* of flip flop 38, and so a change of state in the output signal occurs at T3. At T3 a signal peak has been reached and the peak to peak amplitude of the input signal has exceeded the threshold value. The operation of the circuit of FIG. 1 has now been explained for an input signal varying from a negative peak towards a positive peak.

The operation of the embodiment shown in FIG. 1 will now be explained for an input signal varying from a positive peak towards a negative peak. Immediately after T3 output 36*b*, shown in FIG. 3*e*, is in a "1" state, and thus, output 36*a* is in a "0" state. Since output 38*b* is also in a "1" state, a "1" input is provided to gate 34. The second "1" input necessary to cause gate 34 to provide a "1" output occurs at T4 when the peak to peak value of the signal input shown in FIG. 3*b* again exceeds a signal proportional to the reference signal supplied to reference input 20. The "1" provided by gate 34 causes output 36*a* to change from a "0" state to a "1" state. Output 36*a* then provides the "1" output to gate 30. A negative signal peak occurs at T5 which causes the outputs of peak detector 12 to change logic states. Thus, a second "1" input is provided to gate 30 by output 18 of peak detector 12 at T5. Gate 30 then provides a "1" ouput of flip flop 38 which causes output 38*a* to assume a "1" state and output 38*b* to assume a "0" state. Since the signal output is derived from output 38*b*, the signal output again changes states when a signal peak is reached and the peak to peak value of the signal input exceeds the threshold value.

It is now apparent that an output from amplitude detector 14 causes flip flop 36 to provide an input to the proper gate to flip flop 38 so that flip flop 38 can change states when a signal peak is reached.

The elimination of the effects of noise fluctuations in the signal input is illustrated by the circuit operation at T8. At T8, the signal input shown in FIG. 3*b* passes through a negative peak caused by noise, not signal. The negative peak causes a change in the states of outputs 16 and 18 of peak detector 12. No output is provided by amplitude detector 14, however, because the required signal amplitude has not been exceeded. Thus no change in the state of flip flop 36 occurs and neither gate 28 nor gate 30 can provide a "1" output to cause flip flop 38 to change states. The input signal overcomes the effects of the noise signal at T9 and continues its excursion from a positive peak towards a negative peak. At T10, the required amplitude difference is achieved and an output is provided by amplitude detector 14 which changes the state of flip flop 36 and provides the necessary signal to gate 30 so that a signal peak will cause a change in the state of the output signal. Thus, noise fluctuations which do not exceed the threshold value do not cause a change of state in the output signal and are effectively removed by the present invention.

The operation of a preferred embodiment of peak to peak amplitude detector 14 will now be explained with reference to FIG. 2. In FIG. 2, unilateral storage means 110 is adapted to respond to positive-going signals, and unilateral storage means 114 is adapted to respond to negative-going signals. The positive- and negative-going signals are with respect to a reference, in this case the voltage at the bases of transistors 100 and 102.

Each storage means has three states—store, store-follow, and follow. For example, if storage control 162 causes a small value of resistance to appear in parallel with capacitor 108 of storage means 110, storage means 110 will follow the incoming signal. It will follow because the parallel resistor-capacitor combination in the emitter of transistor 104 will charge and discharge fast enough to prevent the incoming signal from reverse biasing transistor 104. In this case, transistor 104 acts as an emitter follower. If storage control 162 causes a large value of resistance to appear in parallel with capacitor 108, storage means 110 will either store or store-follow. It will store if a positive signal peak is reached and the signal starts going towards a negative peak. It will store because the parallel resistor-capacitor combination in the emitter of transistor 104 will not discharge fast enough and the signal will cause transistor 104 to become reverse biased and nonconducting. Storage means 110 will store-follow if storage control 162 causes a large value of resistance to appear in parallel with capacitor 108 and the input signal continues in a positive direction. In this case, transistor 104 will continue to act as an emitter follower and continue to charge capacitor 108 until a signal peak is reached. Then storage means 110 will store as explained. For simplicity the two states, store and store-follow, will be referred to as the store state.

Which storage means stores and which follows is determined by the signal provided to control input 22 of transistor 178. Initially assume transistor 178 is conducting, then storage means 114 stores a signal and storage means 110 follows a signal. Assume also that the state of transistor 178 was changed from nonconducting to conducting before T1 so that voltage stored by storage means 114 at T1 is the negative peak voltage of a signal input from input means 10.

At T1 then, the signal outputs from both storage means 110 and 114 are equal to the negative peak of the signal input as shown in FIGS. 3*g* and 3*h*. As time progresses, the output from storage means 114 remains equal to the negative peak voltage while the output from storage means 110 follows the signal towards the next positive peak. The output signals from both storage means are provided to combining means 130 where the double ended signal is converted to a single ended signal and provided to comparing means 142. Comparing means 142 compares the signal received from combining means 130 with a reference signal applied to reference input 20 and provides an output indicating the relative magnitude of the two signals. When the signal from combining means 110 is less than the reference signal, one output polarity is provided; and when the signal provided by combining means 130 is greater than the reference signal an opposite output polarity is provided.

As the input signal progresses from the negative peak occurring at T1 to the positive peak occurring at T3, the difference between the output provided by storage means 114, which is storing the negative peak, and the output provided by storage means 110, which is following the signal, increases. Thus the signal from combining means 132 to comparing means 142 also increases. At T2, the difference between the instantaneous value of the input signal provided by storage means 110 and the negative peak stored in storage means 114 is sufficient to exceed the reference signal in comparing means 142, and an output is provided.

The output provided changes the state of flip-flop 36 of FIG. 1, as previously explained, and thus changes the state of the signal provided to control input 22. The change of state of a signal at control input 22 renders transistor 178 nonconducting and causes storage means 110 to store instead of follow and causes storage means 114 to follow instead of store. This change occurs after T2 so that at T3 the signal stored in storage means 110 is the positive peak of an input signal. The circuit action then repeats until the signal difference again exceeds the reference signal and an output is again provided.

The configuration of transistors 100, 102, 104, and 106 in FIG. 2 are such that a zero voltage input signal causes a zero voltage signal to exist across capacitors 108 and 112, with respect to each other. That is, the transistor types are chosen so that the directions of the voltage drops will cancel. Also, transistors 100 and 104 form a temperature and bias compensated transistor pair as do transistors 102 and 106. These temperature and bias compensated transistor pairs aid in maintaining zero signal output between storage means 110 and 114 for a zero signal input.

In FIG. 2, transistors 100 and 102 have their collectors directly connected to their bases which causes these transistors to act as very low conductance diodes. They are biased in a conducting condition by the current through resistor 118 and resistor 122. The biasing current necessary depends upon the signal input level expected and the loading of transistors 104 and 106. Transistors 104 and 106 are emitter follower driving transistors for capacitors 108 and 112. Each storage means will store when the parallel impedance to its respective capacitor is high and follow when the parallel impedance to its respective capacitor is low.

The parallel impedance to each capacitor is determined by storage control 162 and 164. Assuming transistor 178 is conducting, the impedance seen by capacitor 108 approaches the relatively low series impedance of diode 172, conducting and resistor 174 along with the saturated impedance of transistor 178. The impedance seen by capacitor 112 is effectively the resistance of resistor 140 in parallel with the input impedance of transistor 128 because diode 168 is back biased and rendered nonconducting. When transistor 178 is rendered nonconducting, diode 170 is also rendered nonconducting because of its biasing, and the relatively low impedance seen by capacitor 112 is effectively that of diode 168, conducting, and resistor 166 in series with the power supply impedance. The impedance seen by capacitor 108 is then effectively the resistance of resistor 132 in parallel with the input impedance of transistor 126 since diode 172 is back biased and nonconducting. Thus the discharge rate of capacitor 108 may be controlled through the value of resistor 174, and the discharge rate of capacitor 112 may be controlled by the value of resistor 166.

Transistor 126 of combining means 130 functions as an emitter follower and applies the voltage signal existing across capacitor 108 to resistor 138. Transistor 128, however, acts as a current source which provides a current proportional to the difference in signals across resistor 136. Since the voltage at one end of resistor 136 is approximately the voltage existing across capacitor 112 provided by the common emitter action of transistor 128 and the voltage at the other end of resistor 136 is approximately the voltage appearing across capacitor 108, the current provided by transistor 128 is proportional to the difference in the voltage signals appearing across capacitors 108 and 112. The current signal from transistor 128 is then converted to a voltage signal in resistor 134. Notice that the voltage difference between capacitors 108 and 112 is a double ended signal—that is, a signal reference to another signal point rather than ground. The signal provided by transistor 128 is a single ended signal—a signal reinforced to ground.

Comparing means 142 is a standard differential amplifier and shaping circuit.

Values for a preferred embodiment of the circuit shown in FIG. 2 are:

transistor 100=2N 3640
transistors 102 and 104=2N 3646
transistor 106=2N 3640
capacitors 108 and 112=1800 picofarads
capacitor 116=0.1 microfarad
resistor 118=6.8 kilohms
resistor 120=100 ohms
resistor 122=4.7 kilohms
resistor 124=100 ohms
transistors 126 and 128=2N 3638A
resistor 132=220 kilohms
resistor 134 and 136=1 kilohm
resistor 138=2.2 kilohms
resistor 140=470 kilohms
transistors 144 and 146=2N 3565
resistor 148=10 kilohms
resistor 150=560 ohms
resistor 152=1 kilohm
transistor 154=2N 3640
resistor 156=1 kilohm
transistor 158=2N 3646
resistor 166=1 kilohm
diode 168, diode 170, diode 172=1N 643
resistor 174=680 ohms
resistor 176=2.2 kilohms
B+=20 volts
$B_1$+=6 volts
B−=20 volts Now the wave form of FIG. 3*d* can be explained. When the input signal exceeds the reference signal, an output is provided which changes the state of flip flop 36. However, when flip flop 36 changes state, the signal to control input 22 also changes state. A change in state of the signal to control input 22 causes the storage means which was storing to discharge in preparation for its next role—that of an input signal following circuit. As the storage means which stored the last peak discharges towards the instantaneous signal value, the difference between the signals provided by the two storage means decreases below the threshold value and comparing means 142 changes state. Thus, comparing means 142 will have a "1" output only for a time determined by the switching delay in flip flop 36 and storage control 164.

Because the storage means which is storing the last signal leak discharges before the next signal peak is reached, it is ready to begin its role of signal follower immediately. That is, the more the signal input exceeds the threshold, the longer time the storage means have to discharge. This is very advantageous because the requirements upon the storage control means are thereby lessened.

It will be obvious to those skilled in the art that many variations may be made within the teachings of the present invention. For example, storage control means 162 and 164 are shown as controlled commonly by transistor 178. This is not necessary, and individual storage control may be provided to each storage means. For the purposes of the preferred embodiment, commonly controlling storage means 162 and 164 serve to properly time them. Also, a single storage time and discharge time is provided for each storage means because a single resistor and diode determines each time. This is not necessary, however, because a voltage variable resistor or other means, such as a field effect transistor, may be placed in parallel with each storage means to independently and variably control the storage time and discharge time.

Additionally, any peak detector can be used. While one embodiment was explained, many will be familiar to those skilled in the art.

Further, although a single input means 10 was shown, the teachings of the present invention may be applied in a differential input mode.

Additionally, capacitor 116 of FIG. 2 is not necessary if a D.C. input is desired.

Likewise, while the preferred embodiment of the present invention was explained with reference to recovering signals from magnetic tape, no limitation to this use is intended. The present invention is adapted to recover the time information from signals whatever their sources.

A description of the present invention is for illustrative purposes only and is not intended as a limitation. Many alternates and variations will be obvious to one skilled in the art. It is desired that the present invention be limited only by the appended claims in which it is intended to cover the full scope and spirit of the present invention.

What is claimed is:

1. Electrical apparatus for indicating the relative magnitudes of a signal proportional to the peak to peak value of an input signal and a signal proportional to a reference signal, comprising in combination:

(a) first unilateral conduction means, receiving the input signal, for allowing the passage of positive-going signals;
(b) first storage means, accepting the signal from the first unilateral conduction means;
(c) first control means for controlling the length of time a signal is stored in the first storage means;
(d) second unilateral conduction means, receiving the input signal, for allowing the passage of negative-going signals;
(e) second storage means, accepting the signal from the second unilateral conduction means;
(f) second control means for controlling the time a signal is stored in the second storage means;
(g) combining means for providing an output signal proportional to the difference in signals stored in the first storage means and the second storage means;
(h) means connecting each storage means to the combining means;
(i) reference input adapted to receive the reference signal;
(j) comparing means for comparing the output signal from the combining means and a signal proportional to the signal at the reference input and for providing a signal output indicating which signal is larger; and
(k) means connecting the reference input and the combining means to the comparing means.

2. The apparatus of claim 1, wherein:

(aa) each storage means comprises at least one capacitor for storing signals; and
(bb) each control means comprises a controllable impedance for controlling the rate the signal discharges from the capacitors.

3. The apparatus of claim 1, wherein:

(aa) the unilateral conduction means comprise at least one temperature and bias compensated transistor pair for providing voltage signals to the first and second storage means whereby the voltage provided to one storage means, measured with respect to the voltage provided to the other storage means, is substantially unaffected by circuit variations;
(bb) the combining means comprises at least one temperature and bias compensated transistor pair for receiving the double ended signal from the storage means and providing a single ended signal which is substantially unaffected by circuit variations; and
(cc) the comparing means comprises at least one temperature and bias compensated transistor pair for comparing two signals without substantially being affected by circuit variations.

4. Electrical apparatus adapted to receive an analog-type input signal containing logic type time information and to recover the time information, comprising in combination:

(a) a reference input for receiving a reference signal;
(b) means, which accepts the reference signal from the reference input and the input signal, for providing an output signal whenever a signal proportional to the peak to peak value of the input signal is greater than the signal at the reference input;
(c) a peak detector accepting the input signal; and
(d) a logic circuit accepting the output signals from means (b) and the peak detector for providing an output signal indicating when the output signals from the peak detector and means (b) co-exist.

5. Electrical apparatus adapted to receive an analog-type input signal containing logic type time information and to recover the time information, comprising in combination:

(a) a reference input for receiving a reference signal;
(b) unilateral storage means for storing positive-going signals;
(c) unilateral storage means for storing negative-going signals;
(d) means for providing the input signal to each unilateral storage means;
(e) means for controlling the storage time of each storage means;
(f) means, receiving a signal from each storage means, for providing an output signal proportional to the difference in the signals received from each storage means;
(g) comparing means for providing an output signal indicating when the output signal of means (f) exceeds a signal proportional to a signal at the reference signal input;
(h) means connecting the output of means (f) to the comparing means;
(i) means connecting the reference input to the comparing means.
(j) a peak detector accepting the input signal; and
(k) a logic circuit accepting the output signals from means (g) and the peak detector for providing an output signal indicating when the output signals from the peak detector and means (g) co-exist.

6. Apparatus for providing an output when the instantaneous peak to peak amplitude of a signal input exceeds a given level, comprising:

(a) a storage means for storing positive-going signals;
(b) a storage means for storing negative-going signals;
(c) means for providing the signal input to each storage means;
(d) means for controlling the storage time of each storage means;
(e) output means, accepting a signal from each storage means;
(f) means, receiving the signal from the output means, for providing an output signal proportional to the difference in signals from each storage means;
(g) comparing means, having a reference signal input, for providing a signal output indicating when the signal output of means (f) exceeds a signal at the reference signal input; and (h) means connecting the output of means (f) to the comparing means.

7. The apparatus of claim 6, wherein:

(aa) each storage means includes at least one capacitor for storing; and (bb) the storage time controlling means comprises variable resistance means for controlling the discharge of the capacitors.

8. The apparatus of claim 6, wherein:

(aa) the storage means comprise at least one temperature and bias compensated transistor pair for providing stored voltage signals which are substantially unaffected by temperature and bias variations, the stored voltage signal being formed when the voltage of one storage means is measured with respect to the voltage of the other storage means;

(bb) means (f) comprises at least one temperature and bias compensated transistor pair for receiving the double ended signal from the storage means and providing a single ended signal which is substantially unaffected by temperature and bias variations; and (cc) the comparing means comprises at least one temperature and bias compensated transistor pair for comparing two signals without substantially being affected by temperature and bias variations.

9. Electrical apparatus for recovering the time information from a pulse signal input, comprising:

(a) means for indicating when the peak to peak amplitude of the signal input exceeds a given threshold;

(b) means for indicating when a signal peak has occurred in the signal input;

(c) means for connecting the signal input to means (a) and means (b); and (d) means, receiving the indications from means (a) and (b), for providing a signal output whenever the input signal reaches a peak if the input signal has also exceeded the threshold.

10. The apparatus of claim 9 wherein means (a) comprises:

(aa) unilateral storage means forming two groups, one group for responding to positive-going signals and the other group for responding to negative-going signals;

(bb) storage control means for controlling the storage time of each group of storage means; and (cc) comparing means for comparing the signal difference between the first and second group of storage means with a reference signal and for providing an output indicating the relative magnitudes of the two signals.

References Cited

UNITED STATES PATENTS

| | | | |
|---|---|---|---|
| 3,225,213 | 12/1965 | Hinrichs et al. | 328—162 X |
| 3,320,434 | 5/1967 | Ott | 328—150 X |
| 3,369,182 | 2/1968 | Reindl | 328—151 X |
| 3,375,450 | 3/1968 | Ayres et al. | 328—150 |

JOHN S. HEYMAN, Primary Examiner

U.S. Cl. X.R.

307—237, 238, 247, 310; 328—117, 147, 151, 163